US006373964B1

(12) United States Patent
Geissler et al.

(10) Patent No.: US 6,373,964 B1
(45) Date of Patent: Apr. 16, 2002

(54) METHOD FOR IMAGE INSPECTION AND COLOR GUIDANCE FOR PRINTING PRODUCTS OF A PRINTING PRESS

(75) Inventors: Wolfgang Geissler, Bad Schönborn; Bernd Kistler, Eppingen; Werner Huber, Rauenberg; Harald Bucher, Eschelbronn, all of (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 08/643,596

(22) Filed: May 6, 1996

(30) Foreign Application Priority Data

May 4, 1995 (DE) ........................................ 195 16 354

(51) Int. Cl.$^{7}$ ................................................ G06K 9/00

(52) U.S. Cl. ......................... 382/112; 356/237.1; 399/9

(58) Field of Search ................................ 382/112, 141; 101/483, 484, 485, 486, 116, 118, 119, 120; 250/559.01, 559.02, 559.04, 559.08, 559.1; 399/9–11, 15, 16, 23, 38, 39; 29/428; 356/402, 237.1

(56) References Cited

U.S. PATENT DOCUMENTS 4,677,680 A * 6/1987 Harima et al. .............. 382/112
5,014,618 A * 5/1991 Zingher et al. ............. 101/365
5,058,175 A * 10/1991 Aso ........................... 382/112
5,182,721 A * 1/1993 Kipphan et al. ............ 364/526
5,187,376 A * 2/1993 Hashimoto et al. ......... 250/562
5,235,652 A * 8/1993 Nally ......................... 382/112

FOREIGN PATENT DOCUMENTS

| | | |
|---|---|---|
| CH | 509 880 | 8/1971 |
| DE | 40 23 329 A1 | 2/1992 |
| EP | 0 522 301 A1 | 1/1993 |

OTHER PUBLICATIONS

John R. Walker, Graphic Arts Fundamentals, The Goodheart–Willcox Company, p. 143, 1992.*

* cited by examiner

*Primary Examiner*—Jayanti K. Patel
(74) *Attorney, Agent, or Firm*—Herbert L. Lerner; Laurence A. Greenberg; Werner H. Stemer

(57) ABSTRACT

A method for image inspection and color guidance for printing products of a printing press, in which in on-line operation, actual image data of the printed images of the printed products are obtained and compared with nominal image data for the purpose of locating image defects, which comprises the steps of checking, upon the appearance of a defect, before any change in the ink feed is made, as to whether on the basis of the type of defect, some other cause than the color guidance for the deviation is possible.

15 Claims, 3 Drawing Sheets

| | Raster Single Color | Scatte-ring in CMS | Time Gradient in CMF | Compare CMF of zone with CMF of adjacent zone | Compare CMF's in same zone | Paper White Field | Full Tone | Color Change Vector | Register | |
|---|---|---|---|---|---|---|---|---|---|---|
| Clumps | - | X | X | - | - | - | - | possible | - | - |
| Illumination | X | - | possible | X | X | X | X | X | X | X |
| Glass threads | X | X | X | X | - | X | X | | | |
| Optics (dirty) | X | - | X | X | X | X | X | X | X | X |
| Register | X | - | - | - | - | - | X | - | X | - |
| Ink feed | X | - | - | X | X | - | X | X | X | X |
| Paper Quality | X | - | ? | X | X | X | X | - | - | ? |
| Humidity | X | - | - | X | X | - | ? | - | - | - |
| No Ink | X | X | - | X | X | - | X | X | X | X |
| Distance | X | - | - | X | X | X | X | ? | X | X |
| Paper Feed | X | X | X | X | X | X | X | X | X | X |
| Mechanical Failure | | | | | | | | | | |

Note: CMF = Color Measurement Field

Fig. 2

METHOD FOR IMAGE INSPECTION AND COLOR GUIDANCE FOR PRINTING PRODUCTS OF A PRINTING PRESS

The invention relates to a method for image inspection and color guidance for printing products of a printing press, in which preferably in on-line operation, actual image data of the printed images of the printed products are ascertained and compared with nominal image data for the purposes of locating defects.

BACKGROUND OF THE INVENTION

A method of this type is disclosed in U.S. Pat. No. 5,187,376. By the method, in the ongoing production run mode, the printed images of the continuously produced printed products are examined for defects by means of an optical detection zone. This is done by acquiring actual image data from the printed images on the printed products and comparing them with nominal image data. The nominal image data originate from a defect-free original image, so that in the aforementioned comparison, if a deviation between the actual and nominal data occur, the conclusion can be drawn that there is a defect. While a deviation that occurs does indicate the presence of a defect, nevertheless in principle it is not possible to learn what type of defect is involved. If various available provisions were made for eliminating the defect without knowing the precise type of defect, this can cause problems in the production run.

It is also known that on the occurrence of a defect, defective sheets of a sheet-fed printing press are separated; this can be done for instance by means of a by-pass or by inserting seperators. Although these known provisions do accomplish defect designation, nevertheless they do not include defect analysis. With these basic problems in view, it is the object of the invention to create a method for image inspection and color guidance in printed products of a printing press, in which targeted ascertainment and elimination of defects is done that is reliable in terms of the production run process.

According to the invention, this object is attained in that upon the appearance of a defect, before any change in the color guidance including ink control is made, a check is made as to whether on the basis of the type of defect, some other cause than the color guidance for the deviation is possible. That is, if as a result of the nominal/actual comparison a deviation in the image data that indicates a defect is found, then a corrective provision is done in a purposeful way, such that before a change in color guidance and in particular before the performance of color regulation, it is possible to preclude with high probability that the ascertained deviation has some other cause than the color guidance. Other possible sources of defects are all the known printing defects, such as blips, register, color, moisture, stencilling, scumming, shifting, doubling, transfer register marks, and so forth. Operation errors, such as a change of paper type, or too little ink in the ink well and also equipment defects, such as soiled optics, breakage of the optical fibers, a defective lamp, or a voltage drop in electrical devices may also be responsible for the ascertained deviation between the nominal and actual values. In all these cases, the color must not be regulated; instead, a defect report may be sent to the printer, for instance, or the corresponding defect is eliminated automatically by suitable provisions. If a color deviation is detected upon the nominal/actual comparison, then naturally the cause may be incorrect color guidance (incorrect setting of the zone opening of the inking unit), but the other defects mentioned above cannot be eliminated by adjusting the zone opening or openings. If the color control now attempts to compensate for this printing disruption by changing the zone opening, the effects are unpredictable; they can range up to instability of the control operation, yet without eliminating any defect. In the method of the invention, in the on-line image inspection before any possibly necessary correction of color guidance is made assurance is gained that all the other possible causes of the problem can be precluded. Not until it is assured that no other possible causes may be present is the color control activated—last—for instance by ink zone adjustment.

In a further feature of the invention it is provided that an analysis of defect type is performed, in which different predetermined criteria are employed successively, preferably systematically, for detecting the type of defect. Thus for each type of defect, certain criteria are specified, which are employed—for a systematic search for defects—so that the type of defect involved can be predicted with high probability. If the type of defect is known, then a remedy to it can be definitively carried out.

It is also advantageous that a defect elimination provision is carried out in accordance with the ascertained type of defect. Thus if a high probability implies for a certain defect, then to eliminate it only the intended concrete step need be taken.

If the defect type determination is ambiguous, the type of defect that has the highest probability is assumed to be present. Thus if a plurality of the aforementioned criteria are met in the determination of the type of defect, and if this makes unambiguous determination of the type of defect possibly more difficult, then combinations of criteria should be used. Certain combinations of the criteria allow conclusions to be drawn as to the type of defect, and additional aids, such as probability calculation, can be used in order to gain the maximum possible target accuracy in determining the type of defect.

Finally, it is advantageous if where there are a plurality of possible types of defect, a change in ink guidance, in particular activation of ink control is performed last in order to eliminate the defect. Thus not only when there is an unequivocal defect determination if an intervention into the ink control made as the last step, but it also forms the last operation if on the basis of the defect type analysis ambiguity cannot be precluded.

In accordance with the invention, there is provided a method for image inspection and ink guidance for printing products of a printing press, in which in on-line operation, actual image data of the printed images of the printed products are obtained and compared with nominal image data for the purposes of locating image defects, which comprises the steps of checking, upon the appearance of a defect, before any change in the ink feed is made, as to whether on the basis of the type of defect, some other cause than the color guidance for the deviation is possible.

According to a further feature, the method includes the step of performing an analysis of defect type, in which different predetermined criteria are performed successively, and systematically, for detecting the type of defect.

According to still another feature, which includes carrying out the defect elimination process in accordance with the analysis of the type of defect.

According to a further feature, if the defect type analysis is ambiguous, making the assumption that the type of defect that has the highest probability is present.

According to a still further feature, which includes in case the analysis indicates a plurality of possible types of defect, performing a change in ink feed, in particular activation of ink control last in order to eliminate the defect.

Other features which are considered as characteristic for the invention are set forth in the appended claims.

Although the invention is illustrated and described herein as embodied in a method for image inspection and color guidance for printing products of a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The drawings illustrate the invention, wherein:

FIG. 2 is a defect analysis matrix, and

DESCRIPTION OF THE PREFERRED EMBODIMENTS

Figure 1:
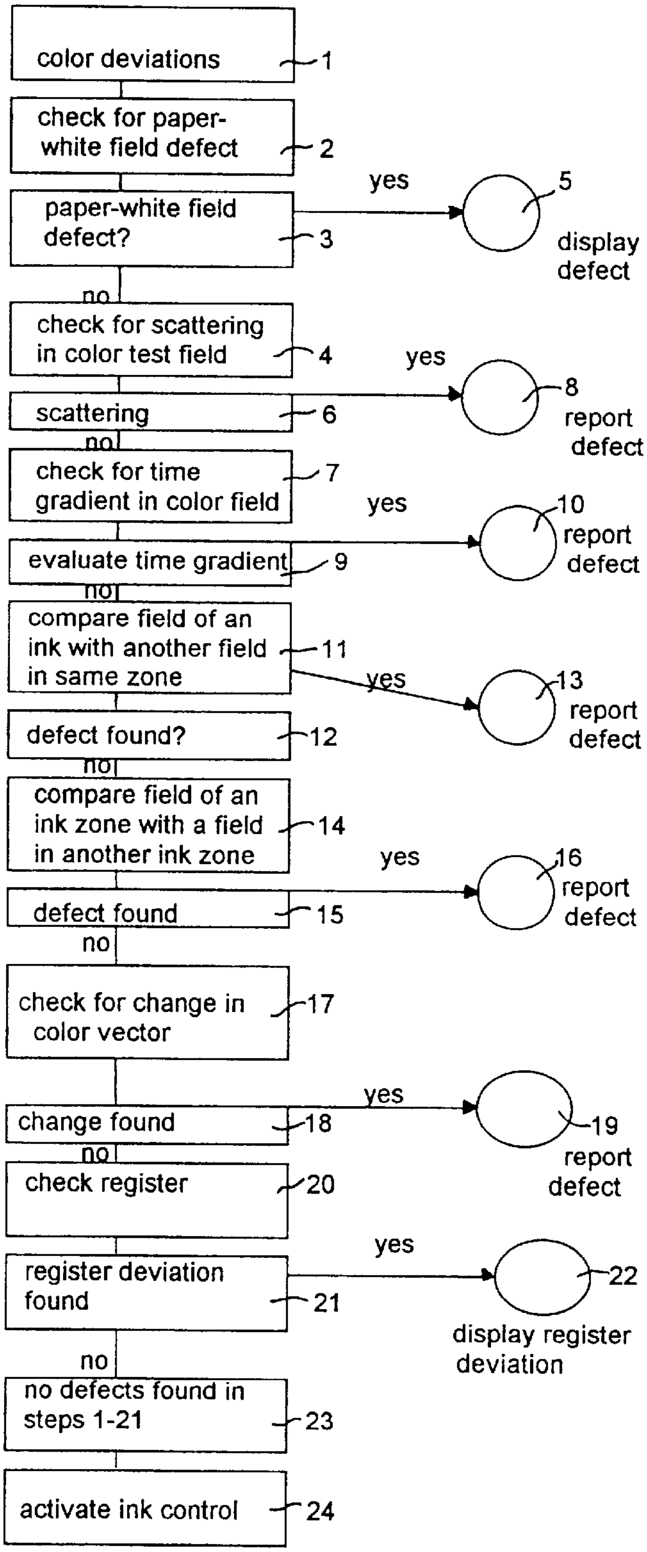
FIG. 1 is a flowchart of the method steps on which the method is based.

As automation of the printing process in printing presses progresses, along with the introduction of quality standards, automatic image inspection in the printing press in the production run process gains increasing significance. By means of an optical detection device, which for instance may be located in the delivery or in the region of the counter-impression cylinder of the last printing unit of the printing press, the continuously freshly printed sheets are scanned for the printed images of the printed products; actual image data are obtained and supplied to an electronic unit, in particular a computer. The goal of this method is to detect defective sheets. To that end, the obtained actual image data are compared with nominal image data. The nominal image data are stored in memory in the computer. They represent an OK sheet, or in other words a defect-free printed copy.

If in the nominal/actual comparison a deviation is detected, then it can be determined on the one hand which sheet or sheets have this deviation, and on the other hand the location of the deviation in the printed image can be found; that is, both the defective sheets and the locations of the defect can be indicated to the printer on a display. Possible sources of defects may be the following: blips, fuzz, register, shifting, doubling, paper type, paper color, lighting, glass fiber defects, spacing between the sheets and the measurement bar of the optical detection device, moisture, no ink or too little ink, paper feeding, no paper, dirty optics, streaks, temporary color changes, for instance from speed changes, and so forth.

The invention takes as the point of departure the thought that certain steps in defect elimination may be uncritical and others in turn may be highly critical for the printing process, so that the critical defect elimination steps must not be performed until it has been assured that some other type of defect is not involved. One critical aspect in the process is ink feed and so ink feed changes should be carried out as the last step in defect elimination.

Proceeding systematically is necessary in the defect type analysis.

To that end, defect causes and their typical appearance will be described below.

Register deviation:

a. Over the entire sheet;

b. In one color at full-tone edges;

c. In multiple colors at full-tone edges;

d. In the multicolor matrix;

e. Not in the full-tone;

f. Not in the single-color matrix field;

g. In the differential image as a gradient image of the master image.

Moisture defects:

a. For instance in the 50% to 80% matrix by increase in tonal value (smearing);

b. Underinking (drip noses) at full-tone edges;

c. Occurring to an increased extent at the onset of printing;

d. Globally, even on unprinted areas;

e. At particular points, as a rule at the onset of printing and in that case usually laterally.

f. No rhythmical occurrence.

Blips:

a. Highly constricted defect effect (no expansion);

b. Are a one-time event or a rare event (lint on sheets of paper);

c. Occur suddenly; preceding sheets are unaffected;

d. Location of defect initially exhibits undercoloration and subsequently overcoloration of one color (lint on the rubber blanket).

Optics dirty, or optical path defective (in the optional detection device):

a. Defect is visible in image-free locations and in the image;

b. Defects continuous in the printing direction (line systems), locally limited at right angles thereto.

Paper:

a. At image-free locations;

b. Over entire width;

c. In the matrix (small area coverages).

Shifting/doubling:

a. In the matrix;

b. Not in the full-tone;

c. Over the entire sheet;

d. Global;

e. Not on unprinted areas;

f. No preferential locations;

g. Dependent on the area coverage combination;

h. Color value;

i. Chronologically rhythmical occurrence.

Color guidance defects:

a. In the full-tone field;

b. In the matrix field;

c. As zonal change in color value;

d. In the mixed field (gray field, for example) as a differential vector in the direction of the corresponding full-tone color;

e. Develop slowly;

f. As a rule not over entire sheet width.

Streaks:

a. Certain spacing;

b. Certain period;

c. Development dependent on printing speed.

In the defect type analysis, preferably criteria are worked through systematically, with a decision process linked to it in order to reduce the number of possible sources of defect until in the ideal case only a single defect remains.

One further option is to link the type of defect and measurement location, or other variables or auxiliary variables together in a matrix (FIG. 2). Once the matrix is set up, then the probability of a certain type of defect can be determined, and in this way the defect that has the greatest probability of occurrence can be ascertained.

As an alternative or in addition to the above, it is also possible to include a chronological component in the defect type analysis, for instance by acquiring the image data or differential values over the course of several sheets, so that their course over time is also included in the defect evaluation.

Possibilities for identifying the defect with the greatest possible probability by means of alternating defect analysis or plausibility checks will now be described.

The flowchart of FIG. 1 illustrates the procedure of defect type analysis. It can be seen that whenever a criterion is met, a skip is then made to the next type of defect, until finally—as the last step—an inking step is taken. The assumption is that the printed images of the printed products are divided into imaginary zones matching the zonal division of the inking unit; imaginary separations are in turn made crosswise to these zones, producing individual fields. Measurement locations of the optical detection device are located inside these fields. If a color field reports a color deviation during the production run, on the basis of a deviation in the aforementioned nominal/actual comparison, then—before the inking is activated—it is necessary to preclude with high probability the possibility of the change in measured value having some other source than the ink feeding. Reference has also already been made to the other errors in operation, such as a change of paper type, too little ink, and so forth, and equipment defects have also been mentioned. In all these cases that do not affect the ink feeding, the inking must not be regulated if a defect occurs; instead, a defect report must be sent to the printer and/or defect elimination done manually or automatically. Since it cannot be seen a priori from the measured values what cause a change in measured value has, the cause must be traced by evaluating auxiliary measured values and auxiliary color measurement fields.

In FIG. 1, in step 1, it is determined by means of the optical detection device that a color deviation exists in one or more than one certain color measurement fields. In step 2, a check is made for a paper-white field. To detect deviations that can be ascribed to changes in the paper surface, fluctuations in lighting, glass fiber breakage or changes in spacing, a color measurement field on the printed image must be defined, which over the entire zone width monitors an unprinted point on the paper. If a significant change in the mean value or standard deviation of the image data occurs in this measurement field, then the other color measurement fields in the same zone will exhibit these changes as well, but those changes cannot as a rule be ascribed to a change in the color guidance. If step 3 shows that there is no defect, then one goes to step 4. If a defect is found, then it is displayed in step 5. In step 4 a check is made for scattering in the color measurement field. If in the current color measurement field—that is, the one to be controlled—the scattering varies by more than 20% and in particular 50%, then a color control step, which naturally takes place in the coloration defect-free mode as well, can be precluded. As a rule, variations in color guidance have effect or only very slight influence on the scattering of the pixel values within the color measurement field. If the, scattering nevertheless varies seriously, then this can be ascribed to such causes of defects as lips, fluff or the like. The permissible variation in the scattering is dependent on the size of the measurement field. The smaller the measurement field, the greater the allowable scattering. The checking takes place in step 6. If there is no error, the one proceeds to step 7. If there is a defect, a report is made in step 8. In step 7, checking of the time gradients is done in the color measurement field. The color guidance is sluggish, and color changes occur only slowly. The maximum measured color gradient if there is a brief severe excess (dead beat) in the color inward is on average 0.4 dE per sheet of paper (dE=delta-E, wherein "dE" represents an error or deviation vector in the color space). That is, at color changes of greater than 0.5 dE per sheet, the color guidance can be precluded as a cause. However, since statistical process and measurement fluctuations in the measured values of this order of magnitude from one sheet to another are the rule, no direct comparison from one sheet to another can be made here; instead, a plurality of sheets must be evaluated, and different methods must be combined:

a. individual measured values: degree>3 dE from sheet to sheet b. individual measured values: degree>5 dE after eight sheets c. mean values: degree>2.0 dE after five sheets. (Mean values are a sliding average of 16 sheets.)

In step 9, the evaluation takes place; in the event of a defect, in step 10 a report is made, or—if there is no defect—one proceeds to step 11. In the course of step 9, it is also possible to check whether the measured image data periodically vary over time, for instance, if every other sheet or every third sheet has a defect, this may be caused by doubling. The result is that the averaged values remain relatively constant, but the color control might be called upon because individual values exceed the tolerances. Since such effects make themselves felt in a marked increase in scattering, for instance of the last 16 or 64 measured values, this kind of cause of a defect can be precluded or designated by checking this scattering. In step 11, a comparison of the field of one zone with similar fields in the same zone is made. If fields that have a similar or identical color composition are located in the same zone, then they must also exhibit the same trend in the control deviation. For example, if a cyan full-tone field in one zone reports too little color, then the corresponding grey field in the same zone must likewise—except for a factor—report a cyan deviation. In the simplest case, in the search for a measurement field a quasi-identical auxiliary field for each control field is defined, which has a certain distance from the control field in the printing direction. In gray- field control in standard printing, the full-tone auxiliary fields can perform this task. If in step 12 a defect is found, then this is reported in step 13. If there is no defect, one proceeds to step 14. Step 14 pertains to the comparison of fields of one zone with fields of neighboring zones. Since measurement/control fields can be chosen for each zone and each color, if there is an error report in one zone the equivalent fields of one or more neighboring zones can be used for checking purposes. A color deviation in one zone must be observable in attenuated form in the neighboring zone.

If this kind of defect is involved, this is involved in step 15 and displayed in step 16. If there is no defect, one proceeds to step 17. In step 17, the color change vector (logic of the adjustment) is done. For the control, the approximate composition of the control field must be known; that is, the area coverage proportions of the colors involved in the printing must be ascertained. Before the ink control is called up, a check should be made as to whether the change in the color values can be caused by the colors present in the field. If a defect is found in step 18, then the report is made in step 19. Otherwise, a skip to step 20 is made. Step 20 pertains to checking the register. A register adjustment causes brief doubling with major changes of measured value in the matrix field, and after a few sheets of paper the initial color value is once again obtained. Because of the major color gradient, while this defect is already intercepted by the chronological color gradient, nevertheless a coarse register monitoring should be done. In particular, this can be done by means of one auxiliary color measurement field at one full-tone edge (per color).

This register check is done in step 21. If there is a defect, this is displayed in step 22.

Otherwise, one skips to step 23, which if there is an absence of defects thus far, or in other words if no defect has been found in the preceding steps, activates the color control (step 24).

In summary it can be stated that for fast elimination of sources of defects and to avoid spoiled sheets, the causes of defects are automatically analyzed and output or eliminated. The knowledge available from the process knowhow of the printing process is converted into search strategies and evaluation algorithms, which when employed sequentially or in parallel linkage allows the drawing of a conclusion on the source of a defect if a defect occurs.

FIG. 2 shows a matrix of the kind that has already been defined above. Possible defects are shown on one axis and phenomena that occur in the measurement are shown on the other axis. In order now to analyze a defect with sufficiently great probability, an evaluation of the ascertained phenomena is effected, preferably automatically. In the matrix, an X means that this phenomenon has appeared. A dash (–) means that the phenomenon is not present. The greater the number of phenomena to be associated with a defect, or the more reliably a phenomenon can be linked with a defect, the greater is the probability that the right defect has been ascertained. It can also be said that with an increasing number of relevant measurement variables in the matrix, defect association can be done all the more equivocally and reliably.

The line captioned "hardware defects" should be understood merely to stand for various hardware components that occur in evaluation electronics and defects which can cause changes in measured values. Since not all the existing hardware components can be listed, two examples will be used here to illustrate the principle:

EXAMPLE 1

CCD Element Defective

The measurement takes place in three color channels (X, Y, Z), each with one CCD element; if one of these elements fails, this makes itself felt in all the measured values; that is, in the matrix, an X would have to be placed in every box in the "hardware" line, equivalent to what has been done in the line headed "no paper". That is, the matrix would have to be expanded by the following columns: X values, Y values, Z values, since a CCD effect makes itself perceptible only in these columns.

EXAMPLE 2

Preprocessing Unit (VVE) Defective

In a measurement system, let it be assumed that depending on the maximum printing speed between two and eight preprocessing units are in operation and are processing the incoming measured values zonally; that is, if there are eight, then the first one is responsible for zones 1–4 and the eighth one is responsible for zones 29–32. A further column in the matrix having the measured values in accordance with this organization is checked, and conclusions about defective preprocessing units can be drawn.

Figure 3:
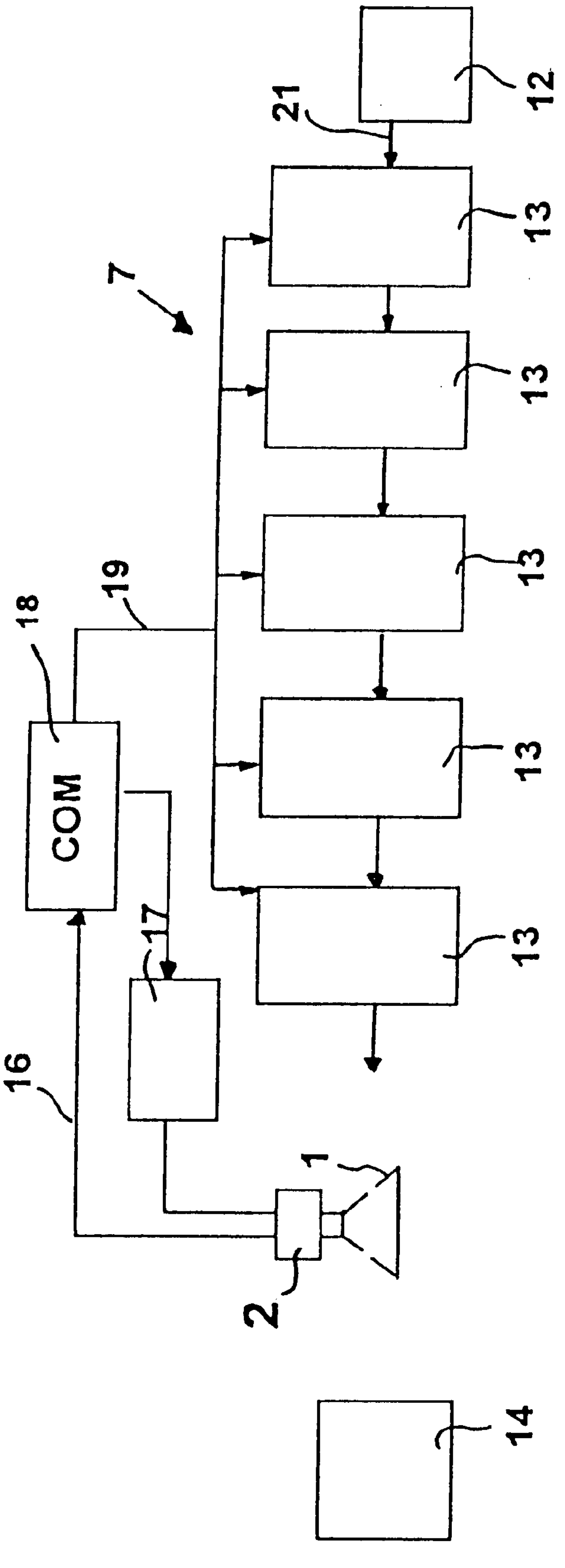
FIG. 3 is a block diagram of a printing machine suitable for performing the method.

In FIG. 3 a typical printing machine 7 suitable for performing the disclosed steps of the invention is composed of four printing units 13, each printing one of the colors of which the printed image is formed. A web or sheet to be printed issue from a feeder 12 and move through the machine as indicated by arrows 21, to a stacker or receiver 14. After leaving the last printing unit the image is scanned by an imaging device 2 of conventional construction. The imaging device 2 transmits on an output connection 16 electrical signals that represent the color vector $F_n$ for all image regions 11 of the image to a computer 18. The computer performs the computations required for processing the image as described above and described in more detail above.

The computer 18 generates outputs on lead 19 which numerically represent the ink feed settings, i.e. the setting of a respective ink gap for each printing unit 13.

What is claimed is:

1. A method for image inspection and color guidance for printing products of a printing press, in which in on-line operation, actual image data of the printed images of the printed products are obtained and compared with nominal image data for the purpose of locating image defects, which comprises the steps of:

carrying out an automated defect analysis, upon the appearance of a defect in the printed products, to identify given sources of the defect and to eliminate sources other than the given sources of the defect before any change in the ink feed is made, on the basis of the type of defect to determine other possible sources which might cause the defect before it is determined that the defect is due to the color guidance, by performing, before changing the ink feed, a defect type analysis in which different predetermined criteria are systematically and successively used to determine a type of the defect, and by ascertaining, before performing a possibly necessary ink feed correction, that the sources other than the given sources of the defect are precluded.

2. The method of claim 1, which includes carrying out a defect elimination process in accordance with the analysis of the type of defect.

3. The method of claim 1, which includes, if the defect type analysis is ambiguous, making the assumption that the type of defect that has the highest probability is present.

4. The method of claim 1, which includes in case the analysis indicates a plurality of possible types of defect, performing a change in ink feed, in particular activation of ink control last in order to eliminate the defect.

5. The method of claim 1, wherein the step of performing the analysis of defect type further includes determining with an optical detection device whether a color deviation exists on one or more color measurement fields.

6. The method of claim 1, wherein the step of performing the analysis of defect type includes the steps of monitoring over an entire zone width of an ink zone an unprinted point on the printed products and determining a presence of paper-white field defects which are ascribed to changes in the paper surface, fluctuations in lighting, glass fiber breakage and changes in spacing.

7. The method of claim 1, wherein the step of performing the analysis of defect type further includes determining whether scattering varies by more than 20% in a current color measurement field.

8. The method of claim 1, wherein the step of performing the analysis of defect type further includes determining whether time gradients in a color measurement field exceed 0.5 dE/sheet.

9. The method of claim 8, wherein the step of determining the time gradients further includes the steps of determining whether the degree is greater than 3 dE from sheet to sheet, determining whether the degree is greater than 5 dE after 8 sheets for individually measured values, and determining whether the degree is greater than 2.0 dE after 5 sheets for mean values.

10. The method of claim 1, wherein the step of performing the analysis of defect type further includes comparing data obtained from a color measurement field of one ink zone with data of similar fields in the one ink zone.

11. The method of claim 1, wherein the step of performing the analysis of defect type further includes comparing data obtained from ink measuring fields of one ink zone with data obtained from ink measurement fields of neighboring ink zones.

12. The method of claim 1, wherein the step of performing the analysis of defect type further includes determining whether a change in color values was caused by colors present in a color measurement field.

13. The method of claim 1, wherein the step of performing the analysis of defect type further includes checking the register adjustment for errors.

14. The method of claim 13, wherein the step of checking the register adjustment further includes providing an auxiliary color management field at a full-tone edge for checking the register adjustment for errors.

15. A method for image inspection and color guidance error determination for printing products of a printing press, which comprises the steps of:

comparing in on-line operations, actual image data of the printed images of the printed products obtained from color measurement fields associated with ink zones with nominal image data for locating image defects;

checking, upon the determination of the existence of the image defects, before any change in the ink feed is made, as to whether on the basis of the type of defect all other causes than the color guidance for the deviation is possible, by performing, before changing the ink feed, a defect type analysis in which different predetermined criteria are systematically and successively used to determine a type of the defect, and by ascertaining, before performing a possibly necessary ink feed correction, that the sources other than the given sources of the defect are precluded.

* * * * *